United States Patent [19]

Knoch et al.

[11] Patent Number: 5,709,752
[45] Date of Patent: Jan. 20, 1998

[54] APPARATUS FOR FILLING INTERSPACES BETWEEN LEADS AND A SHEATH OF A CABLE

[75] Inventors: Horst Knoch, Coburg, Germany; Norbert Niesemeyer, Hickory, N.C.; Wilfried Reissenweber, Roedental, Germany

[73] Assignee: Siemens Aktiengesellschaft, Munich, Germany

[21] Appl. No.: 922,796

[22] Filed: Jul. 31, 1992

[30] Foreign Application Priority Data

Sep. 18, 1991 [DE] Germany .................. 41 31 064.0

[51] Int. Cl.⁶ ............................................. B05C 3/12
[52] U.S. Cl. ................... 118/420; 118/411; 118/412; 156/48; 156/498; 156/500; 425/114
[58] Field of Search ................... 118/411, 412, 118/419, 420; 156/48, 498, 500; 425/110, 113, 114; 264/174

[56] References Cited

U.S. PATENT DOCUMENTS

| 4,033,800 | 7/1977 | Ollis | 156/48 |
| 4,409,154 | 10/1983 | Grenat | 425/114 X |
| 4,474,638 | 10/1984 | Einsle | 156/494 |

FOREIGN PATENT DOCUMENTS

| 0 087 757 | 9/1983 | European Pat. Off. |
| 2 372 497 | 11/1977 | France. |
| 40 03 594 | 8/1991 | Germany. |
| 1 560 960 | 2/1980 | United Kingdom. |
| 2 085 324 | 4/1982 | United Kingdom. |

*Primary Examiner*—David A. Simmons
*Assistant Examiner*—Paul M. Rivard
*Attorney, Agent, or Firm*—Hill, Steadman & Simpson

[57] ABSTRACT

An apparatus for filling the interspaces between leads of a bundle of leads, which may be optical or electrical leads, with a water-repelling compound characterized by a filling head having a pre-filling chamber and a main filling chamber. The leads are supplied via a common admission channel to the pre-filling chamber which has a channel opening that is selected to be only slightly larger than the diameter of the envelope of the leads combined to form a bundle of leads. The pre-filling chamber is followed by a coating nozzle having a diminished cross section, which coating nozzle receives the bundle and discharges it into the main filling chamber.

17 Claims, 1 Drawing Sheet

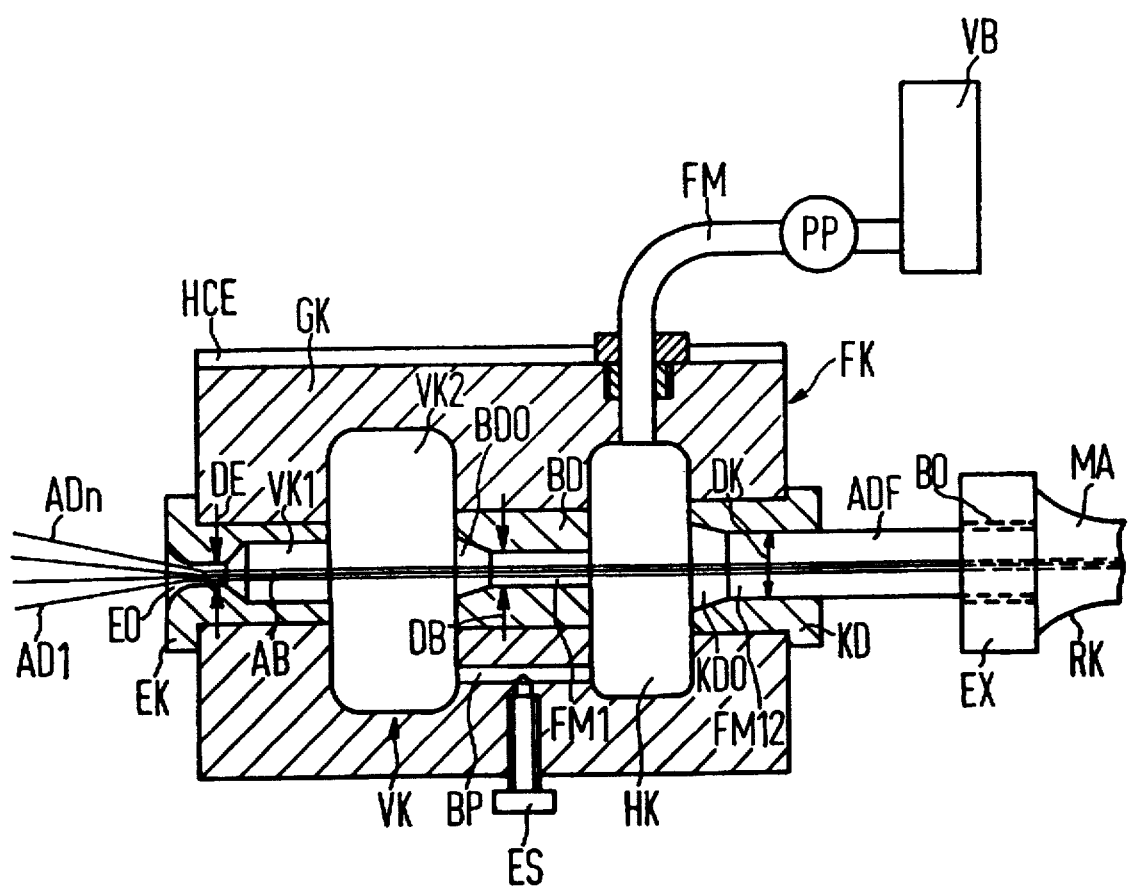

APPARATUS FOR FILLING INTERSPACES BETWEEN LEADS AND A SHEATH OF A CABLE

BACKGROUND OF THE INVENTION

The present invention is directed to an apparatus for filling the interspaces between leads and a sheath of an optical and/or electrical cable with a filling compound on the basis of a filling head that comprises a pre-filling chamber and a main filling chamber.

German Published Application 40 03 594 discloses an apparatus wherein individual leads are brought through individual inlets and then combined into a bundle. Frequently, however it is expedient to not undertake a separate feed of the individual leads but to already introduce them into a filling head as a bundle. In such a case, a reliable and complete filling of all of the spaces or gores is not guaranteed without further ado when special measures are not undertaken.

SUMMARY OF THE INVENTION

The object of the present invention is to improve on an apparatus for applying filling compounds in interspaces between leads and a sheath of an optical and/or electrical cable with a filling compound which guarantees the reliable coating of all the leads of the bundle and works reliably even at high throughput speeds. In an apparatus of this type, the object is achieved in that a common inlet channel for a plurality of leads is provided, this common inlet channel then leading to a pre-filling chamber and has a discharge opening which is selected to be only slightly larger in diameter than the envelope of the leads combined to form the bundle, and the pre-filling chamber has a coating nozzle having a diminished or reduced cross section and which discharges into the main filling chamber.

Since the diameter of the admission opening of the common inlet channel is selected only slightly larger than the envelope of the leads combined to form the bundle, an emergence of filling compound from the chamber at this location is practically precluded. Nonetheless, work can be carried out with relatively high pressures, even in the region of the pre-filling chamber, and this will substantially contribute to filling all of the gores completely and reliably with a filling compound. Water-repellant compounds can be potentially laced with a thixotropic agent particularly coming into consideration as a filling compound. The leads can be stranded with one another or can also enter straight-line. The coating nozzle having a dimensioned cross section will separate the pre-filling chamber, on the one hand, and the main chamber, on the other hand, from one another to a certain extent and effects a type of stripping or evening out of the filling compound which was applied in the pre-filling chamber. The filling compound is applied in a greater thickness in the following main filling chamber so that the bundle adequately tightly surrounded on all sides with filling compound will be present at the output of the filling head.

What is to be understood by the designation "lead" in the framework of this application is any lead including bare or insulated electrical conductors and also light waveguides provided with coatings or surrounded by a protective sheath or a so-called "hollow lead".

Other advantages and features of the invention will be readily apparent from the following description of the preferred embodiments, the drawings and claims.

BRIEF DESCRIPTION OF THE DRAWINGS

The FIGURE is a cross sectional view of a filling head in accordance with the present invention.

DESCRIPTION OF THE PREFERRED EMBODIMENTS

The principles of the present invention are particularly useful when incorporated in a filling head, generally indicated at FK in the FIGURE. The filling head FK comprises a base member GK that may potentially be fashioned as many parts into which filling compound FM coming from a reservoir VB is supplied via a pump PP. The filling compound FM enters into the main filling chamber HK and will proceed into the pre-filling chamber VK through a bypass BP. The leads AD1–ADn, which are to be coated, for example insulated electrical leads or light waveguide leads, are combined to form a bundle AB. This bundle AB can also be potentially stranded. The leads AD1–ADn enter into an admission channel EK in this form, and this admission channel has an approximately conical admission opening EO and is provided with a discharge channel with a constant, ultimate diameter DE in its inside region that is selected to be only slightly larger than an outside diameter or, respectively, the envelope of the bundle AB. It is expedient to select a diameter DE larger by about 0.5–1 mm than the envelope of the tightly packed bundle AB.

The fibers or leads are loosely bundled in the admission region of the admission channel EK, for example the diameter DE thereof is selected so that the packing density of the lead bundle is achieved that already has allowed filling compound to penetrate into the gores at this location but, nonetheless, guarantees a good, central position of the leads AD1–ADn in the extruded column during the further course of the process.

The lead bundle AB enters into the elongated pre-filling chamber VK, whose overall length is selected to be between 20–50 mm. The pre-filling chamber VK, first, comprises a first sub-chamber or region VK1, whose diameter expediently amounts in a range of approximately 1.5–3 times that of the diameter DE. The length of this sub-region or sub-chamber VK1 is expediently selected to be between 5 and 20 min. This subregion VK1 of the pre-filling chamber has the job of preventing the leads and/or fibers from entraining air into the filling compound, and this is insured by the matching via the size of the chamber and the distribution of the compound into the pre-chamber VK.

The sub-chamber or, respectively, sub-region VK1 is followed by a greatly enlarged or expanded sub-chamber VK2, whose diameter is expediently three to eight times the diameter DE. The sub-chamber VK2 advantageously has a length of 10–30 mm and discharges into a coating nozzle BD that comprises a conical admission funnel BDO and a discharge channel. The coating nozzle BD expediently has a length between 30 and 40 mm, and the discharge channel has a diameter DB, which is advantageously selected to be in a range of between 1.5–4 times that of the diameter DE. A type of hard stripping of the first sub-filling compound FM1 applied by the pre-filling chamber VK will occur in this coating nozzle BD, whereby this filling compound FM1 also reliably proceeds into the innermost gores, even given a high throughput speed and a tight bundling of the leads AD1–ADn. The bundle AB of leads provided with the filling compound FM1 proceeds into a main filling chamber HK, whose length is advantageously selected to be between 5 and 25 mm. The main filling chamber HK has a range of diameters expediently approximately 3–9 times that of the diameter DE. A further portion of filling compound is applied here onto the bundle AB, which is already thinly coated with a filling compound portion FM1 so that the filling compound coating FM12 results therefrom and, thus, a uniformly symmetrical and bubble-free compound coat occurs over the traversing lead/fiber bundle.

The volume of the overall pre-filling chamber VK is advantageously selected larger than that of the main filling chamber HK, namely expediently by approximately 1.5 through 3 times. When the pump PP is constructed as a precision metering pump and is operated synchronized with the extrusion line of the extruder EX, then necessary quantities of filling compound FM will always be present.

A calibration nozzle KD, whose inside diameter DK expediently corresponds to approximately 0.9 to 1.1 times the inside diameter of the finished fabricated material and is provided with a conical admission funnel KDO, is provided at the output of the main filling chamber HK. Compared to the outside diameter of the main filling chamber HK, the calibration nozzle KD also carries out a type of hard stripping of the filling compound FM12 so that the bundle ADF, which is completely coated in this way, can enter, for example, into a through bore BO of an extruder head EX wherein a protective cladding MA is extruded onto the bundle ADF as a sheath in the form of a stretched cone. The sheath or, respectively, cladding MA can be a cable cladding or a protective sheath for the bundle leads, which is particularly true in the case of light waveguides, which can be subsequently stranded with other identical bundles to form a cable core, for example, via a stranding process. A finished cable, by contrast, is directly wound onto a drum.

The pre-filling chamber VK and the main chamber HK are connected to one another by a bypass channel BP, whereby the delivery of the filling compound FM initially occurs directly into the main chamber HK. The quantity of filling compound that can proceed into the pre-filling chamber VK and the pressure thereof, as well, can be potentially mechanically, electrically or pneumatically set or, respectively, varied via appropriate adjustment means, for example and adjustment screw ES or a precision regulator valve. The volume stream between the two chambers can be adapted in this way to the property of the respective filling compound, for example corresponding to the filling compounds thixotropy and to the moistening behavior of the leads/fibers. Given employment of light waveguides, the necessary excess fiber lengths can always be set in the region of the filling head FK in this manner.

The delivery into the main chamber HK and the high pressure in the main chamber HK are advantageous in order to enable a bubble-free coating. Disturbances and/or distribution of the filling compound from the main chamber HK into the pre-chamber VK are, thus, prevented. The pressure in the main chamber HK lies between 0.6 and 20 bar and is dependent on the haul-off speed and viscosity of the filling compound. Lower values preferably occur given filling compounds having lower viscosity and lower haul-off speeds. The pressure in the pre-chamber VK advantageously lies at 0.5 through 0.9 times the pressure in the main chamber HK.

The geometry of the admission opening EO of the admission channel EK, as well as the materials employed and residual roughness of the guide surfaces, are of significance for the level of frictional force exerted onto the bundle AB of leads. Hard materials, particularly ceramics, hard metal or diamonds, can be particularly advantageously employed for the admission channel EK, since these are subject to low wear and also yield beneficial coefficients of friction.

The admission channel EK, the coating nozzle BD and the calibration nozzle KD are expediently interchangeably constructed. As a result thereof, an adaptation to different diameters for lead bundles is possible in a very simple manner.

It can be expedient to provide a heat exchanger HCE, which can either be a heater for heating or a cooler for cooling the filling head VK. Heating is expedient in order to make the filling compound FM thinner-bodied, i.e., provide it with a lower viscosity. Cooling is particularly called for when crosslinkable filling compounds, for example compounds consisting of at least two constituents, are utilized, which should not reach the crosslinking temperature within the filling head FK insofar as possible.

Although various minor modifications may be suggested by those versed in the art, it should be understood that we wish to embody within the scope of the patent granted hereon all such modifications as reasonably and properly come within the scope of our contribution to the art.

We claim:

1. In an apparatus for filling the interspaces between leads and a sheath of an optical and/or electrical cable with a filling compound, said apparatus including a filling head that has a pre-filling chamber and a main filling chamber, the improvements comprising the pre-filling chamber having a common admission channel for receiving a plurality of leads, which are loosely bundled together to form a bundle having a bundle diameter, said common admission channel having a diameter of the through-opening thereof slightly larger than said bundle diameter, said admission channel being followed by the pre-filling chamber into which said bundle of loosely bundled leads enters, said apparatus including a coating nozzle having a diminished cross section positioned to receive the bundle leaving the pre-filling chamber and discharging the bundle into the main filling chamber, a bypass interconnecting the pre-filling chamber and the main filling chamber said pre-filling chamber having openings for said admission channel, said coating nozzle and said bypass end being otherwise closed and pressurizable, the main chamber being connected to a reservoir containing the filling compound and pump means for maintaining said filling compound pressurized in said main chamber and in said pre-filling chamber.

2. In an apparatus according to claim 1, wherein the through-opening of the common admission is selected to have a diameter of 0.5–1 mm larger than the diameter of the combined leads forming the bundle.

3. In an apparatus according to claim 1, wherein the coating nozzle is constructed to be interchangeable.

4. In an apparatus according to claim 1, wherein the admission channel is interchangeably constructed.

5. In an apparatus according to claim 1, which includes an interchangeable calibration nozzle being provided at an outlet of the main filling chamber.

6. In an apparatus according to claim 1, wherein the bypass has an adjustable size.

7. In an apparatus according to claim 1, wherein the bypass has a permanent optimized size for a specific operating point.

8. In an apparatus according to claim 1, which includes a heat exchanger means being provided on the filling head.

9. In an apparatus according to claim 8, wherein the heat exchanger means includes a heater for lowering the viscosity of the filling compound.

10. In an apparatus according to claim 8, wherein the heat exchanger means includes a cooler for controlling the temperature of the filling compound to maintain it below a desired temperature so that when working with crosslinking filling compounds the temperature of the filling compound is kept below the crosslinking temperature.

11. In an apparatus according to claim 1, wherein the pre-filling chamber is constructed with multiple parts, including a first sub-chamber at the input side having a smaller diameter than a second sub-chamber following the first sub-chamber.

12. In an apparatus according to claim 11, wherein the diameter of the second sub-chamber amounts to 3–8 times the diameter of the through-opening of the admission channel.

13. In an apparatus according to claim 11, wherein the diameter of the first sub-chamber amounts to 1.5–3 times the diameter of the through-opening of the admission channel.

14. In an apparatus according to claim 1, wherein the coating nozzle has a diameter which amounts to 1.5–4 times the diameter of the through-opening of the inlet channel.

15. In an apparatus according to claim 1, wherein the diameter of the main filling chamber amounts to 3–9 times the diameter of the through-opening of the admission channel.

16. In an apparatus according to claim 1, wherein the volume of the pre-filling chamber is selected to be larger than the volume of the main filling chamber.

17. In an apparatus according to claim 1, which includes means for providing a higher pressure in the filling compound in the main chamber than in the pre-filling chamber.

* * * * *